US005783104A

United States Patent [19]

Kujak

[11] Patent Number: 5,783,104
[45] Date of Patent: Jul. 21, 1998

[54] ABSORPTION REFRIGERATION COMPOSITIONS HAVING GERMANIUM BASED COMPOUNDS

[75] Inventor: Stephen Anthony Kujak, Onalaska, Wis.

[73] Assignee: Gas Research Institute, Chicago, Ill.

[21] Appl. No.: 632,841

[22] Filed: Apr. 16, 1996

[51] Int. Cl.$^6$ ................................................. C09K 5/04
[52] U.S. Cl. ................................ 252/69; 252/67; 252/68; 62/112
[58] Field of Search ........................... 252/69, 67, 68; 62/112

[56] References Cited

U.S. PATENT DOCUMENTS

| | | | |
|---|---|---|---|
| 1,991,465 | 2/1935 | Miller et al. | 252/69 |
| 2,319,667 | 5/1943 | Edmunds | 23/89 |
| 2,319,668 | 5/1943 | Edmunds | 23/89 |
| 2,394,758 | 2/1946 | Edmunds | 159/47 |
| 2,580,983 | 1/1952 | Widell | 62/179 |
| 2,582,306 | 1/1952 | Zellhoefer et al. | 252/68 |
| 2,755,170 | 7/1956 | Stubblefield et al. | 23/89 |
| 2,900,222 | 8/1959 | Kahler et al. | 21/2.7 |
| 3,004,919 | 10/1961 | Rush et al. | 252/67 |
| 3,200,604 | 8/1965 | Greeley et al. | 62/85 |
| 3,478,530 | 11/1969 | Aronson | 62/112 |
| 3,609,086 | 9/1971 | Modahl | 252/68 |
| 4,019,992 | 4/1977 | Krueger | 252/68 |
| 4,675,181 | 6/1987 | Kamiishi et al. | 424/72 |
| 4,912,934 | 4/1990 | Itoh et al. | 62/112 |
| 5,284,029 | 2/1994 | Keuper et al. | 62/476 |
| 5,377,494 | 1/1995 | Takagi et al. | 62/102 |

FOREIGN PATENT DOCUMENTS

| | | |
|---|---|---|
| 0490767 | 6/1992 | European Pat. Off. . |
| 268965 | 6/1989 | Germany . |

OTHER PUBLICATIONS

Chemical Abstracts, vol. 76, No. 37945, "Solubility and State of Germanium Dioxide in Aqueous Solutions of Sodium Hydroxide". Doronkina et al., 1971. No Month Availble.

V.P. Vasil'ev et al. "Thermochemistry of Germanium Tetrachloride Solutions," *Russian Journal of Iorganic Chemistry*, vol. 25, No. 2 (1980). No Date Available.

G. A. Shagisultanova et al. "The $GeO_2$–KOH–KCL–$H_2O$ System." *Russian Journal of Inorganic Chemistry*, vol. 11, No. 9 (Sept. 1966).

Chemical Abstracts, vol. 66, No. 98996, "Germanium oxide–potassium hydroxide–potassium chloride–water system", Shagisultanova et al, 1966. No Month Availble.

Chemical Abstracts, vol. 92, No. 136300, "Thermochemistry of Germanium Tetachloride Solutions". Vasil'er et al, 1980. No Month available.

Chemical Abstracts, vol. 104, No. 136751, "Chemical Stability of Germanium Oxynitride Fims". Aleksandrov et al, 1986.No Month Available.

Registry Number 1310-53-8 for Germanium Oxide, Germanium Dioxide.

*Primary Examiner*—Christine Skane
*Attorney, Agent, or Firm*—Speckman Pauley Petersen & Fejer

[57] ABSTRACT

A refrigerant/absorbent composition is disclosed which comprises an aqueous solution of at least one absorbent salt, present in an amount sufficient to provide utility of said composition as an absorbent, and at least one germanium compound, present in an amount sufficient to inhibit corrosion. Also, a method of inhibiting corrosion by adding a germanium compound to a refrigerant/absorbent composition is disclosed. Further, an absorption heat transferring machine having a working fluid which comprises an absorber salt, a germanium compound and water is disclosed.

6 Claims, No Drawings

ABSORPTION REFRIGERATION COMPOSITIONS HAVING GERMANIUM BASED COMPOUNDS

FIELD OF THE INVENTION

This invention relates generally to refrigerant/absorbent compositions comprising germanium compounds. The invention relates more particularly to such compositions having less potential to corrode equipment and generate hydrogen than other such compositions while retaining a high heat transfer effectiveness. Such compositions can be used, for example, in absorption heat transfer apparatus.

BACKGROUND OF THE INVENTION

In absorption refrigeration, chilling, heat pump, energy storage, and other heat transferring apparatus, a refrigerant/absorbent composition is employed to accept heat from a heat load and transfer this heat to a suitable place for rejection. The refrigerant/absorbent composition includes a more-volatile refrigerant component (such as water) and a less-volatile absorbent component (such as a concentrated aqueous salt solution).

A typical absorption apparatus has four basic components—a generator, a condenser, an evaporator, and an absorber. The refrigerant component is distilled out of the refrigerant/absorbent composition in the generator of the apparatus. After this distillation, the absorbent component left behind is removed to the absorber. At the same time, the distilled refrigerant vapor moves to the condenser where it condenses and sheds heat, and then proceeds to the evaporator which is in contact with the heat load for which cooling is desired. The refrigerant absorbs heat and vaporizes once again in the evaporator. The refrigerant vapor is then removed to the absorber where it sheds heat when it is reabsorbed by the absorber component. The recombined refrigerant/absorbent composition is returned to the generator to complete one cycle. Absorption heat transferring apparatus and its operation are described in greater detail in U.S. Pat. No. 5,284,029, issued Feb. 8, 1994, and assigned to the Gas Research Institute. That patent is incorporated by reference in its entirety here.

One refrigerant/absorbent composition which is frequently used in absorption heat transferring apparatus is a concentrated aqueous composition of lithium bromide (and sometimes other water-soluble salts) as the absorbent, and additional water as the refrigerant. Other ingredients which may be present include lithium chloride and zinc and calcium bromides and chlorides. Such compositions are disclosed generally in U.S. Pat. No. 3,478,530, which is incorporated here by reference.

One difficulty which arises from the use of aqueous solutions of bromides, chlorides, and other salts as working fluids is corrosion of the metal parts of the absorption refrigeration apparatus. When the apparatus has steel or copper parts (which are the predominant materials used for piping and heat transfer surfaces), corrosion can be a particularly acute problem. Corrosion decreases the operable lifetime of an apparatus and may erode one or more internal surfaces of an hermetically sealed apparatus to the point of causing leakage of the refrigerant/absorbent composition. Corrosion poses a further problem by forming hydrogen gas within the absorption refrigeration system. The formation of hydrogen, which is a noncondensible gas at the working temperature of the apparatus, interferes with the normal operation of the system.

Additives and combinations of additives have been considered before to reduce the corrosive effects of refrigerant/absorbent compositions on metal parts and surfaces. For example, U.S. Pat. No. 3,609,086 discloses arsenic trioxide as a corrosion-inhibiting additive in a lithium bromide-water composition. Other known additives include molybdates, chromates, and nitrates. These additives, while displaying some degree of effectiveness in lessening the corrosion of ferrous metal parts, do not sufficiently inhibit corrosion at concentrations of the additive which are economically useful or satisfactory.

SUMMARY OF THE INVENTION

An object of the present invention is to provide a refrigerant/absorbent composition which is inhibited from corroding the metal apparatus in which it is used.

Another object is to provide a refrigerant/absorbent composition which will prolong the operable lifetime of an absorption refrigeration apparatus.

Yet another object of the invention is to provide a method of inhibiting corrosion or formation of hydrogen in an absorption refrigeration apparatus.

The present invention achieves one or more of the foregoing objects, at least to a degree.

One aspect of the present invention is an aqueous refrigerant/absorbent composition comprising an absorbent salt and at least one germanium compound present in an amount effective to inhibit corrosion. Another aspect of the invention is a method of preventing corrosion in an absorption heat transfer machine by adding a germanium compound to its working fluid. Yet another aspect of the invention is an absorption heat transfer machine having a working fluid which contains germanium.

One of the surprising advantages of the present invention over the prior art is commercial efficiency. Germanium compounds employed in effective amounts display a greater degree of corrosion inhibition than other additives. Other benefits will be apparent from the instant disclosure to those skilled in the art.

The refrigerant/absorbent composition of the present invention is suitable for use in any absorption refrigeration apparatus (single-effect, double-effect, or triple-effect) for which aqueous salt solutions are useful working fluids. Additionally, the invention may broaden the suitability of aqueous solutions having bromide and chloride salts for absorption refrigeration apparatus, making such aqueous salt solutions acceptable where the corrosive effects of such solutions previously made them unacceptable or commercially impractical. The refrigerant/absorbent composition of the present invention is suitable for use in an apparatus having parts made of steel, copper or other metal(s). It is conceived that the invention will enable the manufacturers of absorption refrigeration apparatus to construct such apparatus from carbon steels or other steels rather than stainless steels, thereby reducing the cost of materials for the apparatus.

DESCRIPTION OF THE INVENTION

The present composition comprises, as the absorbent component, an aqueous solution of at least one germanium compound present in a sufficient amount to inhibit corrosion and at least one effective salt present in a sufficient amount to provide utility as an absorbent. The present composition further comprises additional water present in an amount sufficient to act as a volatile refrigerant.

In one embodiment of the invention, water is present in an amount sufficient to dissolve all the germanium compound contained within or in contact with the absorbent/refrigerant composition. However, it is also contemplated that, in the presence of appropriate safeguards to prevent obstruction of conduits, an undissolved excess of the germanium compound may reside in an absorption refrigeration apparatus and not be continuously in aqueous solution. The invention does not require sufficient water to prevent precipitation of all germanium compounds employed in every circumstance. Rather, water is present in an amount sufficient to at least substantially dissolve the effective amounts of the absorbent salt and the germanium compound to provide utility as an absorbent and to inhibit corrosion.

Absorbent Salts

Suitable absorbent salts for the present invention include, but are not limited to, salts having at least one cation selected from the group consisting of one or more alkali metals, alkaline earth metals, transition metals, zinc (which may or may not be regarded as a transition metal), and mixtures thereof. Alternatively, suitable salts include, without limitation, salts having at least one cation selected from the group consisting of sodium, lithium, potassium, calcium, magnesium, zinc, iron, cobalt, copper, aluminum, and mixtures thereof.

Suitable salts also include, but are not limited to, salts having at least one anion selected from the group consisting of halide, hydroxyl, nitrate, nitrite, thiocyanate, and mixtures thereof. Alternatively, suitable salts include, without limitation, at least one anion selected from the group consisting of halide, particularly chloride, bromide, iodide, and mixtures thereof.

Among the absorbent salts useful in the present invention are lithium bromide, zinc bromide, calcium bromide and combinations thereof.

The invention does not require any specific amount of salt or specific proportion of salt to water, other than an amount sufficient to provide utility as an absorbent. It is contemplated that from about 10% to about 95%, alternatively from about 70% to about 92%, of one or more absorbent salts may be used. (All percentages in this disclosure are expressed as percentage by weight of the total composition, unless otherwise indicated.) These quantities are examples of the present invention and are not intended as limitations; the present compositions may have greater or lesser percentages of absorbent salts.

Further, the invention does not require any particular proportion of one salt to another salt, although it is contemplated that some proportions may be more effective than others. Some embodiments of the invention comprise lithium and zinc bromides in molar ratios of from about 1/2 to about 3/1, alternatively about 1.5/1. Additional embodiments of the invention comprise lithium, zinc and calcium bromides in molar ratios of from about 0.5/1/0.1 to about 3/1/1. The present compositions may contain other molar ratios of two or more absorbent salts without departing from the present invention.

Germanium compounds

Germanium compounds suitable for the present invention include all those which are soluble in a refrigerant/absorbent composition in an amount effective to inhibit corrosion to at least some degree. Germanium ions are effective at extremely low concentrations, effective corrosion inhibition having been seen at a concentration of 100 parts per million ("ppm") by weight. Even lower concentrations are contemplated, to the extent they are effective. Since germanium effectively inhibits corrosion even when present in very low concentrations, germanium compounds which may not be considered soluble for most purposes are soluble in the effective amounts contemplated in the present invention. For example, germanium tetrabromide, while not very soluble in water, is sufficiently soluble in the range of from about 100 ppm to about 500 ppm to be suitable for the present invention.

Thus, the amount of a germanium compound used herein can range from the minimum amount to the maximum amount which reduces corrosion to any degree. An alternative maximum amount is about 0.1% by weight. An alternative suitable range is from about 100 ppm to about 500 ppm by weight.

Germanium compounds suitable for the instant invention include, but are not limited to, germanium dioxide and germanium tetrabromide. These compounds are effective to inhibit corrosion and soluble in amounts up to at least about 500 ppm, and are probably suitable at higher concentrations as well. In particular, germanium dioxide has sufficient solubility to be effectively used in higher concentrations.

Other germanium compounds which are contemplated for the present invention are other germanium oxides and germanium bromide, as well as germanium chloride, fluoride, iodide, thiocyanate, and sulfide. Complexes of germanium are also contemplated, as are combinations of individual germanium salts. Germanium dioxide has the advantage of being nontoxic, as evidenced by its use in the food additive and poly(ethylene terephthalate) beverage container arts.

In general, at least substantially all of the germanium compound should be dissolved in the refrigerant/absorbent composition, although with appropriate safeguards to prevent obstruction of conduits, the refrigerant/ absorbent composition could be kept in contact with an excess of one or more germanium compounds without departing from the present invention.

It is contemplated that any additional components which do not totally destroy the invention's utility as an absorption refrigeration working fluid may be added to the refrigerant/absorbent composition within the full scope of the present invention. For example, other corrosion inhibitors known to the art or disclosed here are also contemplated for use in the present compositions.

WORKING EXAMPLES

Example I

Corrosion inhibition efficacy tests were carried out as follows. In these tests, the corrosion rates of uninhibited and germanium-inhibited compositions were determined by measuring the weight lost by metal specimens exposed to these compositions.

A testing fluid was chosen to approximate the characteristics (particularly the corrosivity) of the working compositions typically employed in the absorption refrigeration art. The testing solution was an aqueous 85 percent solution of lithium and zinc bromides. One hundred milliliters of this testing solution were placed into each of several Teflon cups. Teflon cups were selected so the test vessels would not interfere with the test.

About 0.05% by weight (500 ppm) germanium dioxide ($GeO_2$) was added to some of the Teflon cups as an inhibitor. At least one Teflon cup containing each iron alloy received the inhibitor and at least one cup containing each iron alloy, serving as a control, did not receive the inhibitor.

Preweighed samples of various iron alloys were inserted into the Teflon cups containing the testing fluids. The various iron alloys tested were UNS S40900, UNS S43000, UNS S30400, UNS S44735, and UNS N08367. These iron alloys are designated in Table I as 409, 430, 304, 29-4C, and AL6XN, respectively. At least two samples of each iron alloy were placed into each of the Teflon cups. The weight and shape of the iron alloy samples were selected to approximate the surface area to solution volume ratio of a commercial absorption refrigeration machine.

These Teflon cups were placed in 400 milliliter general purpose pressure vessels. The test vessels were sealed, evacuated and placed in an oven at a test temperature of 450° F. (232° C.) for a test period of about 168 hours (one week). After this test period, the iron alloy samples were washed off, dried and weighed. The difference in the weights of the samples before and after the testing period were used to calculate the metal corrosion rate of each iron alloy in units of mils penetration per year (MPY). One mil is 25.4 microns, so 1 MPY equals 25.4 microns per year.

The results of the tests are indicated below in Tables I.

TABLE I

| Iron Alloy: | 409 | 430 | 304 | 29-4C | AL6XN |
|---|---|---|---|---|---|
| (U.S. units) | | | | | |
| Corrosion (MPY) with No Inhibitor | 3.52 | 0.52 | 0.53 | 0.04 | 0.00 |
| Corrosion (MPY) with 0.05% GeO$_2$ | 0.52 | 0.19 | 0.12 | 0.05 | 0.16 |
| (metric units) | | | | | |
| Corrosion (microns per yr) No Inhibitor | 89.41 | 13.21 | 13.46 | 1.02 | 0.00 |
| Corrosion (microns per yr): 0.05% GeO$_2$ | 13.21 | 4.83 | 3.05 | 1.27 | 4.06 |

These results demonstrate that germanium salts reduce the rates of corrosion of certain iron alloys by aqueous solutions of lithium and zinc bromides. In particular, the UNS S40900 iron alloy and the UNS S43000 and UNS S30400 stainless steels corroded at significantly lower rates in the presence of germanium dioxide. As Table I indicates, the inclusion of a germanium inhibitor can reduce the corrosion rate of these metals by 85%, 63% and 77%, respectively. This marked reduction in corrosion is an unexpected and beneficial result of the inclusion of a germanium inhibitor in a solution of lithium and zinc bromides.

Example II

A second set of corrosion inhibition efficacy tests were carried out as follows. In these tests, the corrosion rates of compositions having various potential inhibitors were again determined by measuring the weight lost by specimens of an iron alloy exposed to these compositions. The potential inhibitors included germanium compounds which are embodiments of the present invention as well as some other additives traditionally used as corrosion inhibitors in lithium bromide compositions.

A testing fluid was chosen to approximate the characteristics (particularly the corrosivity) of the working compositions typically employed in the absorption refrigeration art. The testing solution was an aqueous 85 percent solution of lithium and zinc bromides. In each of several tests, 65 milliliters of the lithium/zinc bromide solution were placed into a 250 ml glass round bottom flask. The round bottom flask employed a thermocouple well to measure and maintain the test temperature. The condenser section was fitted with a glass tube and stopper so that nitrogen gas could be purged through the test apparatus continuously to prevent interference from oxygen.

About 500 mg/L of one of the tested inhibitors were added to the round bottom flask in each test, except for the control test with no inhibitor. The potential inhibitors tested were germanium oxide and germanium tetrabromide according to the invention, and lithium salts of chromate, molybdate, tungstate, silicate, and nitrate representing prior art.

Preweighed samples of the iron alloy ASTM A36 were inserted into the test apparatus. The weight and shape of each sample was selected to approximate the surface area to solution volume ratio of a commercial absorption refrigeration machine. The test apparatus was sealed and purged with nitrogen for 15 minutes. The round bottom flask was then heated to 400° F. (204° C.) for 3 hours. After each test period, the metal samples were washed off, dried and weighed. The difference in the weights of the samples before and after the testing period were used to calculate the metal corrosion rate of the composition with each potential inhibitor in units of mils (increments of 25.4 microns) per year (MPY).

The results of the tests are indicated below in Table II. These results for each of the potential inhibitors tested are expressed as the metal corrosion rate in mils penetration per year (or microns per year) at 400° F. (204° C.).

TABLE II

| Potential Inhibitor | Inhibitor Conc. mg/L | Metal Corr. Rate @ 400° F. MPY |
|---|---|---|
| (U.S. units) | | |
| Uninhibited | 0 | 1160 |
| Germanium Dioxide | 500 | 180 |
| Germanium Tetrabromide | 500 | 200 |
| Chromate | 500 | 1150 |
| Molybdate | 500 | 1090 |
| Tungstate | 500 | 1280 |
| Silicate | 500 | 1055 |
| Nitrate | 500 | 1550 |

| Potential Inhibitor | Inhibitor Conc. mg/L | Metal Corr. Rate @ 204° C. microns/yr |
|---|---|---|
| (metric units) | | |
| Uninhibited | 0 | 29464 |
| Germanium Dioxide | 500 | 4572 |
| Germanium Tetrabromide | 500 | 5080 |
| Chromate | 500 | 29210 |
| Molybdate | 500 | 27686 |
| Tungstate | 500 | 32512 |
| Silicate | 500 | 26797 |
| Nitrate | 500 | 39370 |

These results demonstrate that germanium salts are many times more effective in reducing corrosion than traditional corrosion inhibitors. In particular, the compositions having germanium dioxide and germanium tetrabromide corroded samples of iron alloy ASTM A36 at a significantly lesser rate than did compositions having chromate, molybdate, tungstate, silicate, or nitrate. As indicated in Table II, the corrosion rate in the presence of a germanium compound was from about 11.6% to about 18.3% of the corrosion rate in the presence of one of the traditional inhibitors. This marked reduction in corrosion is a surprising and advantageous result of the use of a germanium inhibitor rather than (or in addition to) other inhibitors.

Example III

Tests measuring the reduction of hydrogen formation were carried out as follows. In these tests, inhibited and uninhibited compositions were placed in a dynamic flow corrosion apparatus under conditions approximating those found in commercial absorption refrigeration apparatus. The amounts of hydrogen formation were determined by measuring the total volumes of hydrogen gas produced throughout the test period.

A testing fluid was chosen to approximate the characteristics (particularly the corrosivity and resulting formation of hydrogen) of the working compositions typically employed in the absorption refrigeration art. The testing solution was an aqueous 54 percent solution of lithium bromide.

In each test, four liters of this testing solution were placed into a dynamic flow corrosion apparatus having a generator, an absorber and a condenser similar to an actual absorption chiller. In one test, the testing solution remained uninhibited. In other tests, potential inhibitors were added in concentrations of five hundred milligrams per liter. The apparatus was then sealed and evacuated of all air.

The generator vessel of the testing apparatus was heated to 320° F. (160° C.) for a testing period of 336 hours (two weeks), except as noted in Table III below. Periodically, a vacuum pump was used to purge the testing apparatus of hydrogen gas. Table III indicates the total volumes of hydrogen produced over the testing periods.

TABLE III

| Potential Inhibitor | Inhibitor Conc. (mg/L) | Total H₂ Gas Produced (mL) |
|---|---|---|
| Uninhibited | 0 | *1260 |
| Lithium Molybdate | 500 | 280 |
| Germanium Oxide | 500 | 240 |

*This test was terminated after 96 hours, due to the large amount of H₂ produced by then.

These results demonstrate that germanium salts reduce the amount of hydrogen formed in absorption refrigeration systems by aqueous solutions of lithium bromide. In particular, less hydrogen was formed in the apparatus when germanium oxide was added as an inhibitor than when the composition was uninhibited or inhibited with lithium molybdate. This result was unexpected.

The above specification, examples and data provide a basis for understanding and using the disclosed invention. However, any embodiment of the invention within the scope of the claims is within the spirit and scope of the invention. The invention is limited only by the claims which follow.

What is claimed is:

1. A refrigerant/absorbent composition comprising an aqueous solution of:

A. at least one salt, present in an amount, between 10% and 95% by weight of the composition, sufficient to provide utility of said composition as an absorbent; said salt comprising:

i. at least one cation selected from the group consisting of alkali metals, alkaline earth metals, transition metals, zinc and mixtures thereof; and ii. at least one anion selected from the group consisting of chloride, bromide, iodide, and mixtures thereof; and B. at least one germanium compound, present in an amount sufficient to inhibit corrosion of metal.

2. The composition of claim 1, wherein said germanium compound is a compound selected from the group consisting of germanium dioxide, germanium monoxide, germanium dichloride, germanium dibromide, germanium tetrachloride, and germanium tetrabromide.

3. The composition of claim 1, wherein said germanium compound is germanium dioxide.

4. The composition of claim 1, comprising at least approximately 100 ppm by weight of germanium dioxide.

5. The composition of claim 1, comprising at most approximately 0.1% by weight of germanium dioxide.

6. A refrigerant/absorbent composition comprising an aqueous solution of:

(A) at least one salt, present in an amount, between 10% and 95% by weight of the composition, sufficient to provide utility of said composition as an absorbent, wherein said salt comprises a member selected from the group consisting of lithium bromide, zinc bromide, calcium bromide, and mixtures thereof; and (B) at least one germanium compound, present in an amount sufficient to inhibit corrosion of metal.

* * * * *